May 26, 1959 S. P. McCUTCHEN, JR., ET AL 2,888,522

MAGNETIC TRANSDUCER HEAD UNIT

Filed Sept. 6, 1955 2 Sheets-Sheet 1

INVENTOR.
SAMUEL P. McCUTCHEN. JR
JACK E. ESKILSON
BY William J. Flynn
ATTORNEY

May 26, 1959 S. P. McCUTCHEN, JR., ET AL 2,888,522

MAGNETIC TRANSDUCER HEAD UNIT

Filed Sept. 6, 1955 2 Sheets-Sheet 2

INVENTOR.
SAMUEL P. McCUTCHEN. JR
JACK E. ESKILSON

BY William J. Flynn
ATTORNEY

United States Patent Office 2,888,522

Patented May 26, 1959

2,888,522

MAGNETIC TRANSDUCER HEAD UNIT

Samuel P. McCutchen, Jr., Wickliffe, and Jack E. Eskilson, Westlake, Ohio, assignors to Clevite Corporation, Cleveland, Ohio, a corporation of Ohio Application September 6, 1955, Serial No. 532,598

10 Claims. (Cl. 179—100.2)

This invention relates to a magnetic transducer head unit.

In certain types of equipment which employ one or more magnetic recording and/or reproducing head units it is essential that the head unit be mounted to have a definite position with respect to the path of travel of the magnetic record tape, so that the tape will pass over each recording/reproducing gap of the head unit in such a manner that an effective recording or playback operation will take place. In the past, this requirement has meant that when one magnetic head unit is substituted for another in such equipment the new head unit must be carefully adjusted by a skilled operator to bring its gap into the proper position. This has been a time-consuming and expensive operation.

The foregoing difficulties are avoided in the present invention by the provision of a magnetic transducer head unit having reference elements thereon which are constructed and arranged to cooperate with corresponding reference elements on the equipment on which the head unit is to be mounted, and by such cooperation to facilitate locating the head unit properly on such equipment. In its preferred embodiment, the present invention is directed to a multichannel magnetic transducer head unit made up of a plurality of individual magnetic heads having their respective recording/reproducing gaps in precise alignment and a bracket supporting all of the individual magnetic heads and presenting exposed co-planar reference surfaces aligned with the several recording/reproducing gaps. In addition, the bracket is provided with reference elements for the proper locating of the unit with respect to the other directions in space.

It is an object of the present invention to provide a novel magnetic transducer head unit having provision for facilitating the proper locating of the head unit on the equipment with which it is to be used.

It is also an object of this invention to provide a novel multichannel magnetic transducer head unit having co-planar reference mounting surfaces on either end which are aligned with the recording/reproducing gaps of the individual heads in the unit to facilitate the mounting of the head unit on the equipment with which it is to be used.

Other and further objects and advantages of the present invention will be apparent from the following description of a preferred embodiment thereof, illustrated in the accompanying drawings.

Figure 1:
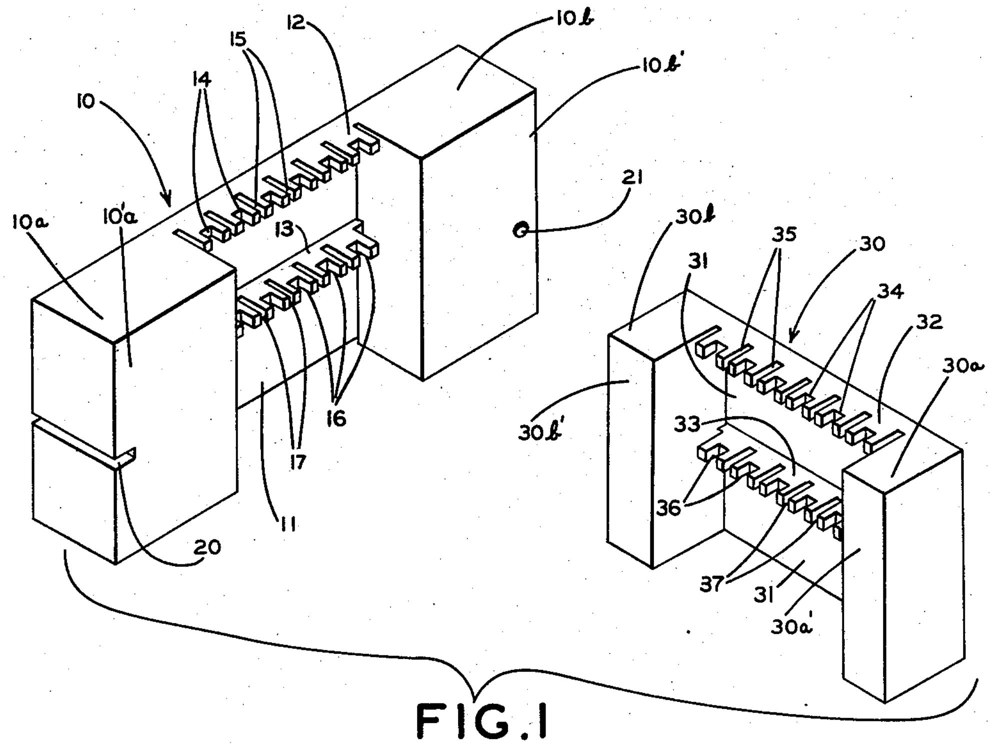
Figure 1 is an exploded perspective view showing the two-piece mounting bracket in the present magnetic head unit.

Referring to Fig. 1, in the preferred embodiment of the present invention the mounting bracket for the magnetic head unit includes a first elongated frame member 10, which is generally U-shaped. This frame member comprises a back wall 11 from which project forwardly an upper flange 12 and a lower flange 13 along the middle of this frame member. The upper flange 12 is formed with a series of alternately disposed pole piece slots 14 and shield slots 15 open at the front of this flange. Similarly, the lower flange 13 is formed with identically arranged pole piece slots 16 and shield slots 17, which are aligned with the corresponding slots in the upper flange 12. The respective pole piece slots 14 and 16 are relatively wide and shallow in depth, while the respective shield slots 15 and 17 are narrow and deeper.

At each end the frame member 10 presents segments **10*a* and 10*b*, respectively, each of which projects forward beyond the open front ends of the upper and lower flanges 12, 13, and each of which has a substantial extent in a direction lengthwise along the frame member 10. The segments 10*a*, 10*b* extend the full height of frame member 10 and at their forward ends terminate in flat faces 10*a*¹ and 10*b*¹, respectively, which are co-planar with one another and which present broad surface areas. At one end, the frame member 10 is formed with a transverse rectangular slot 20 extending through the segment 10*a*. At the other end of frame member 10, a circular transverse hole 21 extends through the segment 10*b*. Preferably, the central axis of hole 21 is co-planar with the center of slot 20**.

The second frame member 30 in the bracket is essentially identical to the above-described frame member 10, except that it is substantially shorter at each end. The forwardly projecting upper flange 32 at the middle of this frame member is formed with short, wide pole piece slots 34 and alternately disposed, narrow, deep shield slots 35. At either end the frame member 30 presents forwardly projecting segments **30*a* and 30*b* which extend in a direction lengthwise along this frame member a distance appreciably less than the corresponding flange portions 10*a* and 10*b* on the other frame member 10. The forwardly projecting segments 30*a* and 30*b* have co-planar, flat front faces 30*a*¹ and 30*b*¹, respectively. A lower flange 33 on frame member 30 projects forward from the back wall 31 and is formed with alternate open-ended pole piece slots 36 and shield slots 37, which are aligned with the corresponding slots in the upper flange 32** on this frame member.

Each of the frame members 10 and 30 preferably is cast as a unit, and each is of brass or other suitable non-magnetic material.

Figure 2:
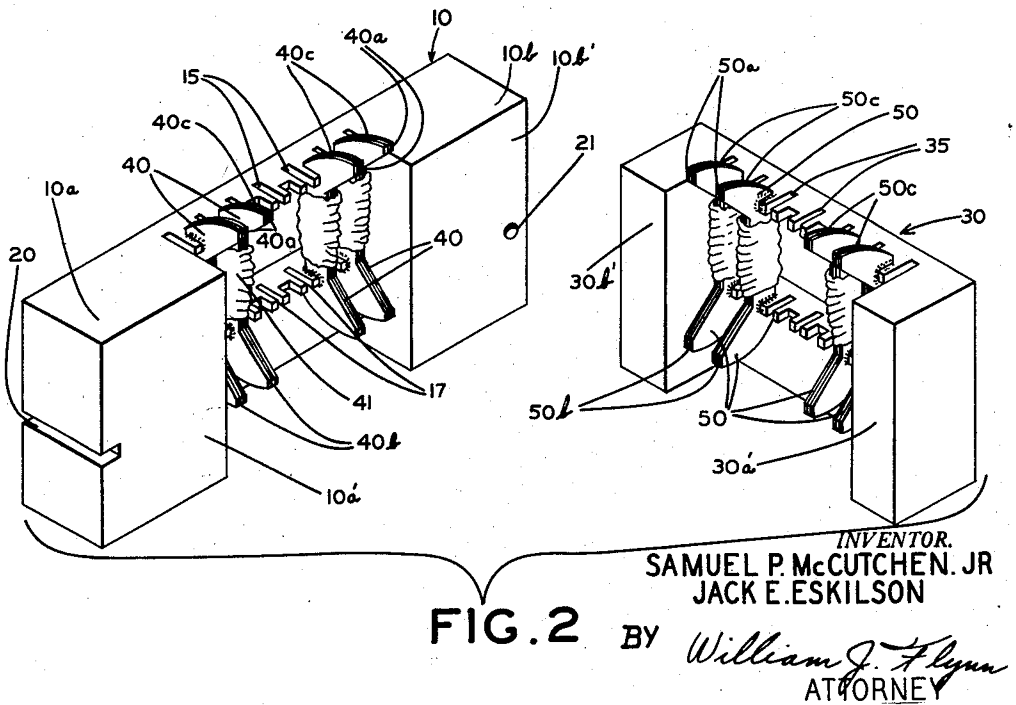
Figure 2 is a similar view showing the magnetic head sections mounted in the respective bracket members.

A plurality of approximately C-shaped laminated magnetic pole pieces 40 are cemented in place in the slots 14, 16 in frame member 10, with their upper and lower pole tips **40*a* and 40*b* disposed slightly behind the plane of the front faces 10*a*¹ and 10*b*¹ on this frame member. These pole pieces have their arcuate upper ends 40*c* projecting beyond the upper end of frame member 10 and are provided with the usual windings 41. In like fashion the opposite pole tips 50 are cemented in place in the slots 34, 36 in the frame member 30 and have their upper and lower pole tips 50*a* and 50*b* disposed slightly behind the plane of the front faces 30*a*¹ and 30*b*¹ on this frame member. The pole pieces 50 are provided with the usual windings 51 and present arcuate ends 50*c* projecting beyond the upper end of frame member 30**. For purposes of clarity, the pole pieces for certain of the slots are omitted in Figs. 2 and 3.

The integral assembly of frame member 10 and the pole pieces 40 is subjected to a lapping operation in which the pole tips 40$a$ and 40$b$ and the front faces 10$a^1$ and 10$b^1$ on this frame member are lapped so that these front faces are exactly co-planar with the pole tips. In the same manner the integral assembly of frame member 30 and the pole pieces 50 is lapped to bring the pole tips 50$a$, 50$b$ and the front faces 30$a^1$ and 30$b^1$ into precise co-planar relationship.

Thin magnetic shield plates 64 are inserted into the aligned slots 15, 17 and 35, 37 on the frame members 10 and 30, respectively, to magnetically shield the adjacent individual heads from one another. The shield plates are electrically connected together by soldering them to a wire (not shown).

Figure 3:
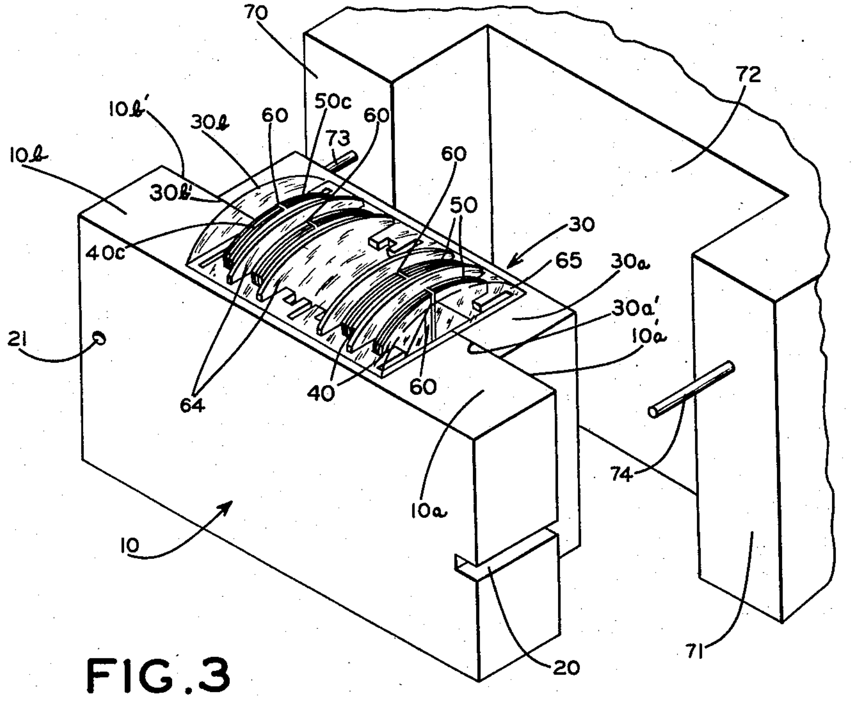
Figure 3 is a perspective view of the assembled magnetic head unit of the present invention, along with the part of the equipment on which the head unit is to be mounted.

The two frame and pole piece sub-assemblies, after lapping, are brought into confronting relationship and extremely thin non-magnetic shims 60 are clamped between the pole tips on the confronting individual pole pieces (Fig. 3). The frame members 10 and 30 are secured together in this position, as by casting suitable plastic 65 about the assembly, as shown in Fig. 3. The cast plastic presents an arcuate upper surface which extends even with the arcuate ends 40$c$ and 50$c$ of the individual magnetic heads 40, 50 and the shields 64 projecting beyond the upper end of the frame assembly 10, 30.

Figure 4:
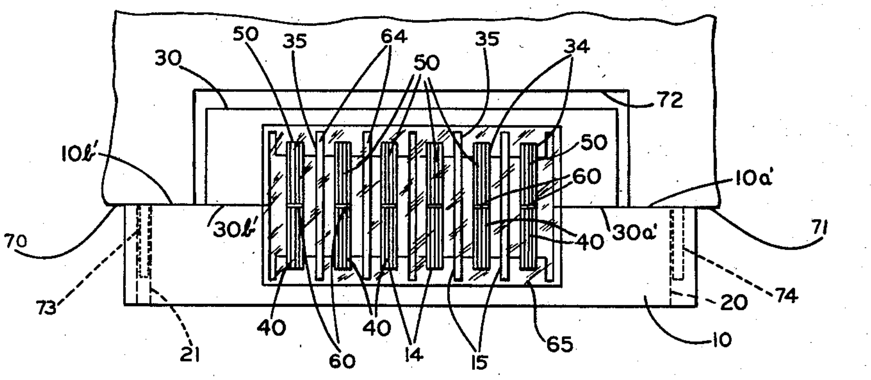
Figure 4 is a top view showing the present magnetic head unit mounted in place on the equipment with which it is to be used.

With the parts secured together in this fashion, it will be apparent from Figs. 3 and 4 that the broad lapped front faces 10$a^1$ and 10$b^1$ on the frame member 10 are exposed at either end of the head unit and serve as reference surfaces aligned with the recording/reproducing gaps of the individual heads in the unit. This novel structural feature of the present head unit may be used advantageously when mounted as shown in Figs. 3 and 4. Here, the equipment on which the head unit is to be mounted presents a pair of flat co-planar exposed faces 70, 71 on opposite sides of a recess 72 which receives the smaller half of the head unit. Dowel pins 73, 74 project forward from these faces 70, 71, respectively, and are positioned to be received snugly in the hole 21 and slot 20 in the frame member 10 of the head unit to properly locate the head unit vertically and endwise in Fig. 3. When the head unit is mounted in this manner, with its exposed faces 10$a^1$, 10$b^1$ abutting against the faces 70, 71, the recording/reproducing gaps of the individual heads are thereby automatically aligned with the faces 70, 71.

In actual practice, rather than starting with different sized frame members 10 and 30, it may be preferable to have these frame members identical initially. Then, after the frame and pole piece sub-assemblies have been assembled together, the ends of one of these identical frame members are cut off to leave the front faces on the other frame member exposed at either end, resulting in the head unit shown in Figs. 3 and 4.

It is to be understood that, while there have been described herein and illustrated in the accompanying drawings a particular presently preferred embodiment of this invention, various modifications, omissions and refinements which depart from the disclosed embodiment may be adopted without departing from the spirit and scope of the present invention. For example, the principles of the present invention may be applied to a single channel head unit, as well as to the multichannel head unit illustrated.

We claim:

1. A magnetic transducer head unit for operation in transducing equipment having a reference surface element comprising, magnetic transducer head means having opposite pole pieces presenting confronting cooperating pole tips on opposite sides of transducing gap means, at least one of said pole tips defining a planar pole face, and a mounting bracket within which said transducer head means is mounted for supporting said head in said transducing equipment, said mounting bracket presenting at least one planar reference surface means co-planar with the plane of the said pole face, said planar reference surface means cooperating with said reference surface element on said transducing equipment to accurately align said transducing gap means in said transducing equipment.

2. A magnetic transducer head unit as set forth in claim 1, further characterized by said mounting bracket presenting two spaced apart planar reference surfaces both of which are co-planar with the plane of the pole face.

3. A magnetic transducer head as set forth in claim 1, further characterized by said transducing head means comprising a plurality of aligned transducer heads each having a pole tip defining a pole face and with all of said pole faces being co-planar.

4. A magnetic transducer head as set forth in claim 3, further characterized by said mounting bracket presenting two spaced apart planar reference surfaces both of which are co-planar with the plane of the pole faces.

5. A magnetic transducer head unit comprising a magnetic head having opposite pole pieces presenting confronting lapped pole tips on opposite sides of a recording/reproducing gap, and a bracket supporting said head and presenting at either end of the head broad reference surfaces lapped co-planar with the pole tip of one of said pole pieces.

6. A magnetic transducer head unit comprising a magnetic head made up of two generally C-shaped pole pieces positioned in opposed confronting relationship and presenting confronting lapped pole tips on opposite sides of a narrow recording/reproducing gap, and a two-piece bracket comprising a first frame member receiving one of said pole pieces and a second frame member receiving the other pole piece, each of said frame members presenting at either end of the head lapped surfaces co-planar with the pole tips of the respective pole pieces, the lapped surfaces on said first frame member projecting substantially beyond the ends of the second frame member and presenting broad exposed references faces thereat.

7. A magnetic transducer head unit comprising first and second frame members, each of said frame members having co-planar lapped surfaces at each end, a first generally C-shaped magnetic pole piece supported by said first frame member and terminating in a pole tip lapped co-planar with said lapped surfaces on the first frame member, and a second generally C-shaped magnetic pole piece supported by said second frame member and terminating in a pole tip lapped co-planar with said lapped surfaces on the first frame member, said frame members having their respective lapped surfaces abutting against each other and positioning the respective pole pieces in confronting relation so that the pole pieces make up a magnetic head, the lapped surfaces on said first frame member projecting beyond the respective ends of the second frame member and defining broad exposed reference face thereat.

8. A multichannel magnetic transducer head unit comprising a series of individual magnetic heads, each of said individual heads comprising opposite pole pieces presenting confronting lapped pole tips on opposite sides of a recording/reproducing gap, and a bracket supporting said individual heads in side-by-side relation with their respective lapped pole tips co-planar and their recording/reproducing gaps aligned, said bracket presenting at either end of the series of heads broad reference surfaces lapped co-planar with the pole tips at one side of the aligned recording/reproducting gaps.

9. A multichannel magnetic transducer head unit comprising a series of individual magnetic heads, each made up of two generally C-shaped pole pieces positioned in opposed confronting relationship and presenting confronting lapped pole tips on opposite sides of a narrow recording/reproducing gap, a first frame member receiving the pole pieces at one side of the recording/reproducing gaps and supporting said pole pieces with their lapped pole tips co-planar, and a second frame member receiving the pole pieces at the other side of the recording/reproducing gaps and supporting said pole pieces with their lapped pole tips co-planar, said frame members presenting at either end of the series of heads abutting lapped surfaces co-planar with the lapped pole tips of the respective pole pieces, the lapped surfaces on said first member projecting substantially beyond the respective ends of the second frame member and defining broad exposed reference faces thereat.

10. A multichannel magnetic transducer head unit comprising first and second frame members, each of said frame members having co-planar lapped surfaces at either end, a first series of generally C-shaped magnetic pole pieces supported by said first frame member and terminating in pole tips lapped co-planar with said lapped surfaces on the first frame member, and a second series of generally C-shaped magnetic pole pieces supported by said second frame member and terminating in pole tips lapped co-planar with said lapped surfaces on the second frame member, said frame members having their respective lapped surfaces abutting against each other to position the pole tips of said first series of pole pieces in confronting relation individually to the respective pole tips of said second series of pole pieces so that the confronting pole pieces form individual magnetic heads, the lapped surfaces on said first frame member projecting beyond the respective ends of the second frame member and defining broad exposed reference faces thereat.

References Cited in the file of this patent

UNITED STATES PATENTS

| | | |
|---|---|---|
| 2,689,274 | Saeger | Sept. 14, 1954 |
| 2,744,165 | Bauer et al. | May 1, 1956 |
| 2,756,280 | Rettinger | July 24, 1956 |

FOREIGN PATENTS

| | | |
|---|---|---|
| 815,548 | Germany | Oct. 1, 1951 |
| 1,112,823 | France | Nov. 23, 1955 |